(12) United States Patent
Dusseux et al.

(10) Patent No.: US 6,501,796 B1
(45) Date of Patent: Dec. 31, 2002

(54) METHOD AND DEVICE FOR VIDEO COMPRESSION

(75) Inventors: Jean-Christophe Dusseux, Rennes (FR); Philippe Guillotel, Vern sur Seiche (FR)

(73) Assignee: Thomson Licensing S.A., Boulogne-Cedex (FR)

( * ) Notice: Subject to any disclaimer, the term of this patent is extended or adjusted under 35 U.S.C. 154(b) by 0 days.

(21) Appl. No.: 09/308,518
(22) PCT Filed: Nov. 24, 1997
(86) PCT No.: PCT/FR97/02118
§ 371 (c)(1),
(2), (4) Date: May 20, 1999
(87) PCT Pub. No.: WO98/24061
PCT Pub. Date: Jun. 4, 1998

(30) Foreign Application Priority Data

Nov. 28, 1996 (FR) ............................................. 96 14601

(51) Int. Cl.⁷ ............................. H04B 1/66; H04N 7/36
(52) U.S. Cl. ............................. 375/240.12; 375/240.16; 348/699
(58) Field of Search ..................... 348/699; 375/240.12, 375/240.16; H04N 7/36

(56) References Cited

U.S. PATENT DOCUMENTS 6,157,677 A * 12/2000 Martens et al. ........ 375/240.16

OTHER PUBLICATIONS

Guenter, B. K. et al., "Motion compensated compression of computer animation frames", SIGGRAPH Aug. 1–6, 1993, pp. 297–304.*

Guenter B K etal: "Motion compensated compression of computer animation frames" Computer Graphics Proceedings, Proceeding of SIGGRAPH 20$^{TH}$ Annual International Conf. on Computer Graphics and Interactive Techniques. The Eye of Technology, Aug. 1–6, 1993, pp. 297–304.

Knabe G: "QPEG software video technology for business, eduation, entertainment and multimedia communication" Papers Presented at the Int'l Conf. on Wireless Computer Communication: Emerging Business Opportunites, 1995, pp. 147–154.

Rodriguez A A etal: "Scripting languages emerge in standards bodies" IEEE Multimedia, Winter 1995 IEEE, vol. 2, No. 4, pp. 88–92.

* cited by examiner

Primary Examiner—Howard Britton
(74) Attorney, Agent, or Firm—J. S. Tripoli; R. H. Kurdyla; J. M. Navon

(57) ABSTRACT

The invention relates to a process for compressing digital data of a sequence of synthesis images describing a scene which is the subject of a script, comprising a processing step for modelling the scene on the basis of mathematical data, a step of image rendering for creating a synthesis image from this modelling and a partitioning of this synthesis image into image blocks, differential coding of the current image block on the basis of a block of at least one synthesis image, this block being defined on the basis of at least one motion vector, so as to provide a residual block, characterized in that the motion vector is calculated from mathematical data emanating from the synthesis script and defining the apparent motion of the various objects constituting the scene which is the subject of the sequence. Applications are image synthesis in production. For video games, these are for example interactivity or virtual reality applications.

13 Claims, 1 Drawing Sheet

METHOD AND DEVICE FOR VIDEO COMPRESSION

Figure 1:
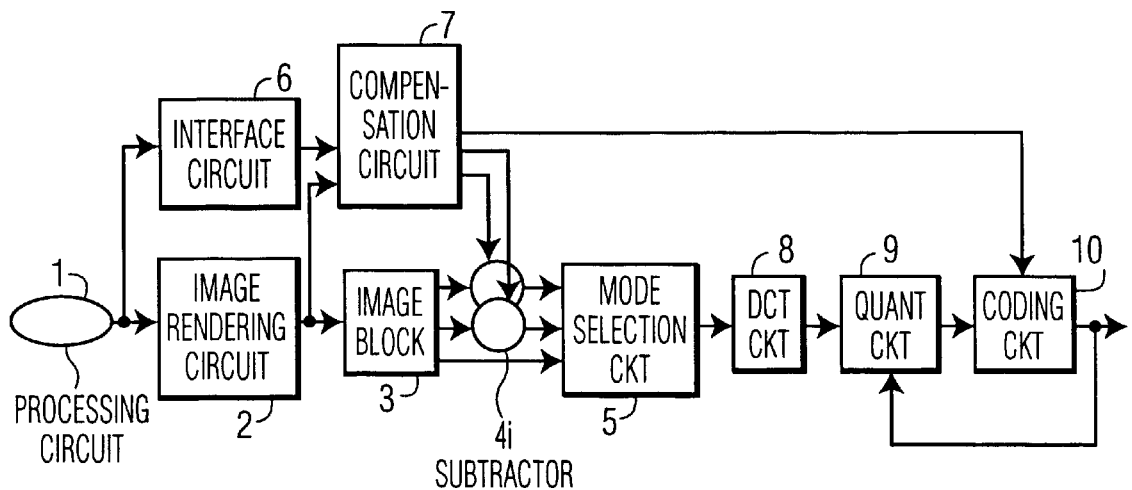

The synthesis of images makes it possible to create, with the aid of computer tools, so-called virtual images. They emanate from an abstract description and from digital calculations. This involves using a collection of methods via 2D and 3D graphics libraries, which are possibly accelerated by specific hardware circuits of the accelerator graphics cards type and via suitable interfaces of the API type (standing for "Application Program Interface").

The process for creating these images can be split up into various steps.

It comprises firstly a phase of modelling, that is to say of computing or acquiring objects using a description model, the aim of which is to describe the constituent objects and assemble them so as to construct a viewable scene therefrom.

Let us cite for example the model of polygonal type in which the objects are split up into multitudes of elementary polygons or facets. Graphical primitives are utilized for defining, assembling or modifying these elementary geometrical entities.

These models are interpretable: they may be associated with kinds of graphics engines, for example colouring (or "shading") of triangles, anti-aliasing of texture, etc. They have capacities, that is to say properties or capabilities, which are both behavioural, such as motion, explosion, . . . , and also visual, such as texture, colour, mirror effects, etc. They will be able to interact with their environment when constructing a scenario, for example with lights, with the other objects. There is therefore, secondarily, a construction of a moving scene which governs the global organization of these models over time (here taken in the sense of the time to effect a given application), that is to say the definition of a scenario or animation.

Lastly, depending on the applications (CAD, production of images, simulation, etc.), the final step consists in creating digital images from this scenario. This last step is called rendering or the method of image "rendition", the purpose of which is to render the scene as realistically as possible. It may be very expensive in terms of calculation time, and require large memory capacities both in respect of the models used and in respect of the data related to the programs involved. For example, rendition methods such as radiosity or ray tracing make it possible to obtain quality images, but at an even higher cost, the calculation algorithms implemented being very complex.

The volume of information represented by digital images has given rise to the development of various compression standards such as JPEG, H.263, MPEG-1, MPEG-2, and soon MPEG-4 making it possible to manipulate, whether for storage or transmission, volumes of information which are compatible with the present technology. The MPEG-2 standard, nowadays the more generic, makes it possible to compress all existing formats of images with the aid of various profiles and levels defined in the MPEG standard, the best known of which is MP@ML ("Main Profile at Main Level"), for images in the conventional television format. The structure of the coders which carry out such video image compressions, according to the prior art, rely on various types of images: Intra, Predicted or Bidirectional (I, P and B, respectively), the main difference being the temporal mode of prediction. The coding kernel is conventional with a frequency splitting based on the DCT ("Discrete Cosine Transform"), followed by quantization and entropy coding, so as to obtain, at the output of the coder, a binary train which must comply with the standard, that is to say a specific syntax.

Temporal prediction is performed by estimating the motion between images separated in time, on the basis of image blocks of size 16×16 pixels for example. The motion is deduced from a correlation between the block of the current image and a block of a search window of a previous or following image. Next, each block of size 8×8 pixels of the image is predicted with the calculated displacement vector, and only the error between the estimate and the original is coded.

The compression of data, whether of conventional images or synthesis images, therefore utilizes the conventional processes such as motion estimation. The circuits which carry out such calculations and the associated circuits are complex and the cost of such a setup is high. For example, the motion estimation and motion-compensated interpolation circuits account for perhaps half the complexity of an MPEG-2 type coder.

The motion information, still according to conventional processes, does not always correspond to the actual motion. It simply involves correlations generally with regard to luminance information. The fact that the field of vectors consisting of the motion vectors of an image does not reflect the actual motion precludes optimal compression of data, in particular in the case of differential coding of vectors. This is because, for macroblocks corresponding to zones of uniform motion, the cost of transmitting identical or slightly different vectors, in differential coding, is smaller than the cost of transmitting random vectors.

Moreover, the fact that the motion vectors obtained according to the conventional "block matching" process do not necessarily reflect the actual motion precludes utilization of the vector field to carry out interpolations or extrapolations of images of good quality during for example conversions of frequency, of digital video recorder slow motion modes, etc.

An incorrect motion vector field also precludes the utilization of new techniques of coding using the contour information for an image rather than the macroblocks. This is because the compression of data according to these new techniques is based on image segmentation and the actual displacement of these "segments" defining the uniform zones.

Thus, the lack of reliability of the motion estimation precludes optimization of the performance of the coder in terms of degree of compression or of image quality for a given bit rate or the effective utilization of this motion information at the decoder.

The purpose of the invention is to alleviate the aforesaid drawbacks during coding of synthesis images.

To this end, its subject is a process for compressing digital data of a sequence of synthesis images describing a scene which is the subject of a script, comprising a processing step for modelling the scene on the basis of mathematical data, a step of image rendering for creating a synthesis image from this modelling and a partitioning of this synthesis image into image blocks, a differential coding of the current image block on the basis of a block of at least one synthesis image, this block being defined on the basis of at least one motion vector, so as to provide a residual block, characterized in that the motion vector is calculated from mathematical data emanating from the synthesis script and defining the apparent motion of the various objects constituting the scene which is the subject of the sequence.

Its subject is also a device for compressing digital data of a sequence of synthesis images describing a scene which is the subject of a script, comprising a processing circuit for modelling the scene, the images of which are to be synthesized on the basis of mathematical data, a circuit for image rendering and for partitioning the image into blocks which receives the cues from the processing circuit for effecting a synthesis image and partitioning the image obtained into image blocks, an image blocks motion compensation circuit receiving the cues from the processing circuit so as to provide predicted blocks, a subtractor for taking the difference between the current block originating from the circuit for image rendering and for partitioning into image blocks and the predicted block originating from the motion compensation circuit so as to provide a residual block, a discrete cosine transformation circuit for the image blocks originating from the circuit for image rendering and for partitioning into image blocks or residual blocks originating from the subtractor, the choice being made by a mode selection circuit as a function of energy criteria, a circuit for quantizing the transformed coefficients, characterized in that the motion compensation circuit utilizes the mathematical data provided by the processing circuit and representing the displacement of the modelled objects constituting the scene so as to calculate the motion vectors associated with the current block and defining the predicted block.

According to another embodiment, its subject is a device for compressing digital data of a sequence of synthesis images describing a scene which is the subject of a script, comprising a processing circuit for modelling the scene, the images of which are to be synthesized on the basis of mathematical data, a circuit for image rendering and for partitioning the image into blocks which receives the cues from the processing circuit, for effecting a synthesis image and partitioning the image obtained into image blocks, an image blocks motion compensation circuit receiving the cues from the processing circuit, characterized in that it transmits in intra mode one image from among N images of the sequence, N being a predetermined number, this image N being that which is the subject of the rendition calculation by the circuit for rendition calculation and for partitioning into image blocks, in that the other images are transmitted in inter mode by way of residual blocks representing the difference between a current block and a predicted block and in that residual blocks are null and defined by the single motion vector calculated from the mathematical data.

In general, the techniques of image rendering amount to representing an "object"-oriented scenario as images. Now, the script, that is to say the scenario, comprises all the possible information with regard to the objects in the scene and also their various properties. In the case of image synthesis, a 2D or 3D script gives the exact displacement of the objects over time. This script then serves to generate the final digital video images (rendering). Thus, instead of using the information consisting of the pixels making up a visual image, that is to say one which is not modelled, to estimate the motion, modelling tools are used to calculate the actual motion in the image sequence.

Apart from the reduction in complexity, by using the actual motion rather than the estimated motion it is possible to improve the quality of the prediction and the global performance of the coder.

Figure 2:
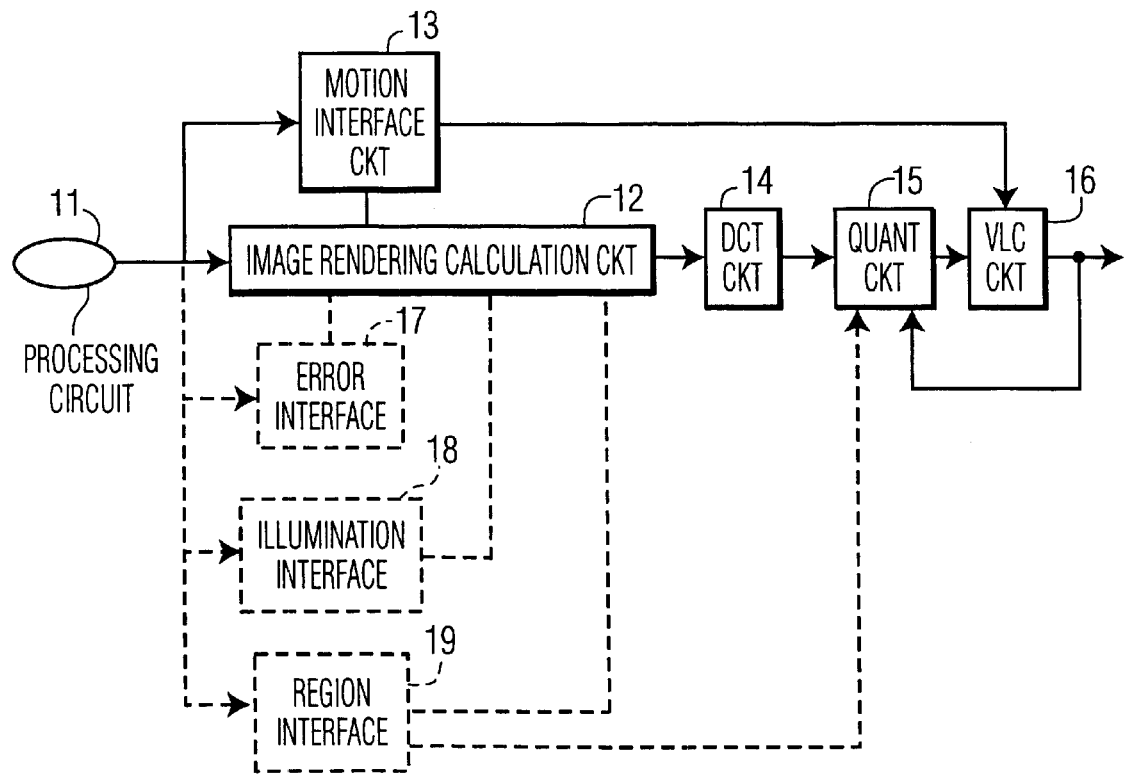

Other features and advantages of the invention will become clearly apparent in the following description given by way of non-limiting example and offered in conjunction with the appended figures which represent:

FIG. 1, the architecture of a video compression device according to the invention;

FIG. 2, a simplified architecture of such a device.

FIG. 1 gives a description of a first version of the device according to the invention.

As explained above, the calculations related to image synthesis are of great complexity and generally carried out by dedicated workstations. It is such a station, here referred to as the processing circuit 1, which performs a modelling of a scene previously defined on the basis of a script for the purpose of creating these synthesis images representative of the scene which is the subject of the script. The information thus obtained from the processing circuit is transmitted in parallel to an image "rendering" circuit 2 and to an interface circuit 6. The output of the rendering circuit is linked in parallel to the input of a circuit for partitioning into image blocks 3 and to a first input of a motion compensation circuit 7.

A first output of the partitioning circuit is linked directly to a first input of a mode selection circuit 5.

A second output i from among n of the partitioning circuit is linked to a first input of a subtractor $4i$ from among n. The output of the subtractor $4l$ is linked to a second input i from among n of the mode selection circuit 5.

The output of the interface circuit 6 is itself linked to a second input of the motion compensation circuit 7. An output i from among n of the latter circuit is linked to a second input of the subtractor $4i$.

The output of the mode selection circuit 5 is linked to the output of the device across a Discrete Cosine Transform calculation circuit 8, a quantization circuit 9, and a Variable-Length Coding circuit 10 placed in series. The output of the variable-length coding circuit, which is the output of the device, is also returned to a second input of the quantization circuit 9 (including bit rate regulation). Another output of the motion compensation circuit 7 is linked to a second. input of the variable-length coding circuit 10. In this example, the motion compensation 7 is performed without the previous decoded images, that is to say the reconstructed images. Prediction error accumulation problems, a phenomenon which is known as "drift", may then occur. To improve the process, it is possible to use a negative-feedback loop with inverse quantization, inverse DCT, which provides the compensation circuit 7 with the previous decoded images.

The processing circuit 1 therefore symbolizes the computer tools required for the mathematical formulation of a scenario. Its function, as explained above, is to model a scene in three dimensions, that is to say to define the mathematical equations of the objects making up the scene and of their motions defined by the script. These mathematical modelling data may also originate from computer files accessible to the processing circuit and storing for example predefined models.

The role of the image rendering circuit is to create the synthesis images. It carries out the conversion into pixels from the scene modelled. The luminance and chrominance digital information for the image obtained is transmitted to the partitioning circuit 3 which carries out a partitioning of each image into macroblocks, blocks of size 16×16 pixels comprising four 8×8 pixel image blocks in accordance with the MPEG-2 standard.

The role of the interface circuit 6 is to convert the displacement information given by the application, here image synthesis, into a macroblock-wise motion field which is transmitted to the motion compensation circuit 7. With each macroblock there is associated at least one motion vector calculated by this interface circuit from the mathematical data for modelling the scene, which are received from the processing circuit 1. The mathematical transformations such as translation, rotation, homothety, etc. are represented as two-dimensional vectors associated with each macroblock.

Of course, the motion vectors represent the apparent motion of the objects, taking into account for example the displacement of the viewpoint of the scene.

This conversion of the displacement is performed as follows:

let us assume that the displacement is an object translation defined by a three-dimensional vector whose projection in the plane of the image gives a vector of coordinates in the plane (Dx, Dy). With all the whole image macroblocks representing a part of this object, there is associated this same vector which is regarded as the motion vector (Dx, Dy) such as defined in the MPEG standard.

Particular cases still remain, such as macroblocks at the boundaries of objects, covered or uncovered zones.

As far as boundary blocks are concerned, the simplest solution consists in taking the majority vector in the macroblock, that is to say the vector which corresponds to the largest number of pixels in the macroblock, as motion vector associated with the macroblock. It is also conceivable to select the vector corresponding to the object rather than that of the background. This choice is not paramount since the device described possesses a mode selection circuit which will choose the most suitable mode, for example the intra mode if the reconstruction (hence the estimated motion) is not good.

As regards the covered/uncovered macroblocks, the simplest solution is to assign zero motion to the macroblock, knowing that the zones corresponding to these covered or uncovered macroblocks will be poorly reconstructed. A more elaborate solution is provided by the MPEG-2 syntax which makes provision for forward and backward vectors in respect of the B (Bidirectional) images. These two types of vectors are then calculated by the motion interface circuit 6 on the basis of the data provided by the processing circuit 1 and are therefore regarded as forward and backward motion vectors associated with the macroblock processed. Then, an uncovered zone can be reconstructed with the forward-directed (in time) motion, a covered zone by the backward-directed motion. The choice of the mode of coding is also performed here by the mode selection circuit.

The MPEG standard in fact makes it possible to assign various types of vectors to a macroblock:

the vectors of "forward" or "backward" monodirectional type which take into account respectively an image prior and an image subsequent to that corresponding to the macroblock processed;

the vectors of bidirectional type utilized in the case in which the mode selection circuit chooses the bidirectional predictive mode. This in fact involves two vectors associated with the macroblock, the macroblock processed being matched, by a forward vector and a backward vector, with a macroblock which is an averaging of the two macroblocks defined by these vectors, which averaging is a function of the luminances of the matched pixels and of the temporal distances to the macroblock processed. These vectors may be the same as those defined above.

The motion compensation circuit 7 carries out, on the basis of the motion vector fields and of the previous (and following) images transmitted by the rendition calculating circuit, the calculations of predicted images, that is to say motion-compensated images, as well as the partitioning of the images thus obtained into macroblocks.

The current macroblock transmitted by the partitioning circuit 3 is received on the positive input of the subtractor 4, the corresponding macroblock of the predicted image, which macroblock is transmitted by the compensation circuit 7, is received on the negative input of the subtractor. The "residual" available at its output, macroblock corresponding to the difference formed in regard to each pixel, is transmitted to the mode selection circuit 5.

In fact, with each type of motion vector defined above there corresponds a predicted image calculated by the compensation circuit. This circuit therefore has as many outputs n as types of vectors chosen and each output is linked to a subtractor 4i receiving the current block of the image on the other input. All the types of residuals calculated are transmitted to the mode selection circuit on its n inputs which also receives, on another input, the current macroblock, directly from the partitioning circuit 3.

The mode selection circuit 5 determines the mode in which the macroblock will be coded. The modes of coding available are for example:

coding with motion compensation or without motion compensation, that is to say with or without transmission of motion vector;

intra or non-intra coding (inter-image coding, inter-frame of like parity or of unlike parity, predictive inter or predictive bidirectional coding, etc.);

if non-intra coding, coding of the residual or not (in the case in which the residual is very small).

The choice of mode is made by the mode selection circuit by performing a macroblock energy calculation in each mode and by choosing the one which gives the smallest energy. In the majority of cases, the energy calculation is approximated by sums of absolute values.

The selected block then undergoes a Discrete Cosine Transformation, a quantization and a Variable-Length Coding type coding. The bit rate is tapped off at the output of the device so as to be transmitted to the quantizer, this regulating loop acting on the quantization interval by way of a bit rate regulation block included within the quantization circuit for the sake of simplification.

The vectors associated with the processed macroblock are transmitted by the motion compensation circuit to the variable-length coding circuit 10 which carries out a multiplexing of these values with the quantized coefficients of the macroblock.

It is of course conceivable to simplify this device, for example by limiting the type of predicted macroblocks submitted to the subtractors. The choice of mode would then be carried out partially upstream, by the interface circuit, when the latter can deduce, from the information which it possesses, the mode which allows the best correlation.

The interface circuit then transmits a mode cue on a supplementary input of the mode selection circuit 5 so as to impose this mode. The mode selection circuit is then a simplified circuit.

Another illustrative embodiment is described in FIG. 2.

The output of a processing circuit 11 is linked in parallel to the input of an image rendering calculation circuit 12 and to the input of a motion interface circuit 13. A bidirectional link connects these last two circuits. The output of the image rendering calculation circuit 12 is linked to the output of the device across a Discrete Cosine Transform calculation circuit 14, a quantization circuit 15 and a Variable-Length Coding circuit 16 placed in series. The output of the Variable-Length Coding circuit, which is the output of the device, is also returned on a second input of the quantization circuit 15 so as to constitute a regulating loop.

The output of the motion interface circuit 13 is linked to a second input of the Variable-Length Coding circuit 16.

The processing circuit 11 has the same characteristics and functions as that described in FIG. 1.

The rendition calculation performed by the circuit 12 is here different from that described in FIG. 1 in the sense that it is performed by sampling, that is to say for an image every N images of a sequence of images to be transmitted.

The image constructed by this circuit is then partitioned into macroblocks and blocks of images, which function is also carried out by this image rendering circuit. The blocks are transmitted in succession to the circuit for calculating the Discrete Cosine Transform 14 which carries out the cosine transform of these blocks, to the quantization circuit 15 which performs a quantization of the transformed coefficients, a waiting and a serialization of these coefficients and finally to the Variable-Length Coding circuit 16 which carries out an entropy coding of the serialized data. The regulating loop taps off the bit rate at the output of the device so as to supply a bit rate regulation circuit, built into the quantizer 15, which acts on the quantization interval so as to perform such regulation.

The motion interface circuit 13 calculates the motion vector fields in a manner analogous to that described for the motion interface circuit 6 of FIG. 1 and transmits the motion vector or vectors assigned to the current processed macroblock to the Variable-Length Coding circuit. It also provides the mode cue corresponding to this or these vectors. The coding circuit carries out a multiplexing of the motion vector associated with the current macroblock together with the mode of coding and the transformed and quantized data of this macroblock so as to transmit all of this as output from the device.

The link between the motion interface circuit 13 and the rendition calculation circuit 12 makes it possible to exchange the information relating to the partitioning into macroblocks, the current macroblock transmitted to the DCT circuit, the mode of coding, etc.

The image rendering procedure, which consumes a great deal of calculation time, is therefore simplified here. The idea consists in using only certain synthetic images and the motion between the images which are then missing. The calculated synthetic images are separated in time (that is to say one image every N image periods) and typically represent the images coded in intra mode by the coder. The so-called missing images are neither calculated, nor transmitted, nor stored. The decoder is responsible for creating them with the aid of the motion cue which is then transmitted to it. Thus, everything occurs as if the coder were in a configuration in which the prediction error images were null (the motion-compensated prediction is eliminated).

The mode of coding transmitted by the circuit 13 is dependent on the images processed by the rendering circuit. With the images calculated corresponding to an intra coding, the motion vectors for these images are not transmitted. The intermediate images are regarded as images coded in inter mode together with a zero prediction error (coefficients of the residual macroblock at zero), the motion represented by the motion vectors being the actual calculated and not estimated motion and the synthesis images being assumed to be free of noise. At the decoder, these Inter images are recreated from the intra image and from the motion vectors transmitted for each inter image, as indicated above.

In this application, the macroblockwise motion (motion vector) may be inaccurate, the defects in the boundary blocks are not corrected and the illumination is assumed to be constant between the Intra images. Such a device is reserved for applications in which the image quality may be lesser, such as video games. The processing speed, the data compression and the low cost of construction are the characteristics imposed on such devices, to the detriment of the image quality.

In a first improvement of this device, in terms of image quality, the mode of coding depends on the type of macroblock processed. An error interface circuit 17, represented dotted in FIG. 2, is added to carry out this new function.

This circuit receives the information from the processing circuit 11 so as to exchange, with the image rendering calculation circuit 12, the information relating to the coding of the current macroblock.

Its role is to detect the errors which mainly occur in the contours of objects in motion. Specific processing is provided for the relevant macroblocks. When the macroblocks to be transmitted are boundary blocks, information either calculated by the circuit for calculating errors on the basis of information originating from the processing circuit 11, or received from the motion interface circuit 13 via the image rendering calculation circuit, the error interface circuit imposes, on the image rendering calculation circuit, the calculation of the image rendering for these boundary blocks. The mode is then forced to intra for this macroblock, information transmitted to the motion interface circuit 13. A simplified rendition calculation is therefore performed by the image rendering calculation circuit 12 for the images coded in inter mode, for just these blocks of the image.

A second improvement of the device consists in adding an illumination interface 18, represented dotted in FIG. 2.

This illumination interface 18 receives the information from the processing circuit 11 so as to exchange, with the image rendering calculation circuit 12, the information relating to the coding of the current macroblock.

The function of this circuit is to convert the illumination model into an error image for the coder. The switch from an object cue to a cue suitable for coding according to the MPEG standard is done for example by regarding the change of illumination from one image to another as being a prediction error. Thus, the cue related to the variation in luminance of the macroblock processed from one image to another is transmitted to the image rendering calculation circuit 12 by the illumination interface 18, and this cue is then transmitted by the rendering circuit to the DCT calculation circuit in the form of a residual block, regarded as it is as a prediction error. The motion interface 13 simultaneously transmits the motion vector calculated for this processed macroblock and the corresponding mode type. At the decoder, the reconstructed block will be that corresponding to the motion vector to which the residual block is added.

A third improvement of the device consists in adding a region interface 19 which makes it possible to transmit the region cue to the quantizer 15.

This region interface 19 receives the cues from the processing circuit 11, exchanges the information relating to the coding of the current block with the image rendering calculation circuit 12 and transmits region information to the quantizer 15.

This interface partitions the image into regions as a function of the modelling information originating from the processing circuit 11. A label is assigned to each region or more exactly to each block as a function of the region to which it belongs, the data regarding the image blockwise partitioning originating from the image rendering calculation circuit 12. The quantization interval calculated by the quantization circuit 15 is modified as a function of this label, in such a way as to transmit a region cue "carried" by the quantization interval to the decoder. This modification may depend on the characteristics of the regions: reduction in the quantization interval for nonuniform regions and/or regions of low motion, increase in the quantization interval for highly textured regions or regions of large motion. Thus, the quality of the decoded image is improved, for a given bit rate, allowing for the fact that the defects in blocks are less perceptible for the zones which are highly textured or of large motion.

The same techniques as for the motion vectors may be used for ambiguous cases of belonging: a block is declared to belong to the main region if the latter is in the majority in this block (majority mode), or else a block is declared to belong to the main object of the image if this object forms part, even partially, of this block (main object mode).

This interface makes it possible to improve the performance and the possible applications of the coder: subjective improvement for example by virtue of the reduction in the quantization interval for nonuniform zones or zones of small motion as has just been seen, 2D or 3D applications, improvement in interactivity in respect of the decoder by virtue of the region cue.

Of course, these are illustrative embodiments and the various alternatives may be combined or taken separately according to the image quality desired, the application sought, the speed of processing or the degree of compression desired.

Thus the device of FIG. 2 may very well build in functions of the device of FIG. 1 and vice versa. For example, the circuit for rendition calculation and for partitioning into image blocks 12 may also carry out the functions of the subtractors 4$i$ for the calculation of differential blocks or residual blocks on the basis of information from the motion compensation circuit 13 as well as the functions of the mode selector for providing the DCT circuit 14 with the image block. The number of operating modes is thus increased, of course to the detriment of the complexity of the circuits.

The processes and devices described are entirely compatible with the MPEG type data compression standards both as regards the compressed data transmitted and the decoding.

An application of the present patent is the synthesis of images, be this during production (virtual studio, cartoons, video synthesis or films, special effects), for video games, for interactive applications or for virtual reality applications.

The invention may be implemented in built-in platforms (workstation, games console), given the level of simplicity obtained by virtue of the invention.

What is claimed is:

1. Process for compressing digital data of a sequence of synthesis images describing a scene which is the subject of a script, comprising a processing step for modelling the scene on the basis of mathematical data, a step of image rendering for creating a synthesis image from this modelling and a partitioning of this synthesis image into image blocks, a differential coding of the current image block on the basis of a block of at least one synthesis image, this block being defined on the basis of at least one motion vector, so as to provide a residual block, characterized in that the motion vector is calculated from mathematical data emanating from the synthesis script and defining the apparent motion of the various objects constituting the scene which is the subject of the sequence.

2. Process according to claim 1, wherein image rendering is performed for only one image out of N of the sequence, N being a predetermined number, this image being coded in intra mode and in that the differential coding is performed on blocks of the intermediate images.

3. Process according to claim 2, wherein the current image block to be coded of an intermediate image is identical to the synthesis image block matched by the motion vector so as to provide a block with zero residual.

4. Process according to claim 1 wherein the coding of the boundary image blocks of an image is forced to intra mode.

5. Process according to claim 1 wherein the illumination cue for calculating the synthesis image is utilized to calculate a residual block for the inter coding of the current block as a function of the disparity in luminance between the block of the previous image, matched by the motion vector associated with the current block, and the current block.

6. Process according to claim 1, wherein it effects a segmentation of the image, assigns a label to each of the blocks of the image, and modifies the quantization interval as a function of this label so as to transmit a region cue.

7. Process according to claim 6, wherein the quantization interval is increased for the blocks belonging to regions which are highly textured or have large motion and decreased for those belonging to regions which are uniform or have small motion.

8. Device for compressing digital data of a sequence of synthesis images describing a scene which is the subject of a script, comprising a processing circuit for modelling the scene, the images of which are to be synthesized on the basis of mathematical data, a circuit for image rendering and for partitioning the image into blocks which receives the cues from the processing circuit for effecting a synthesis image and partitioning the image obtained into image blocks, comprising a motion interface circuit which utilizes the mathematical data provided by the processing circuit and representing the displacement of the modelled objects constituting the scene so as to calculate at least one motion vector associated with an image block and defining a predicted block on the basis of which the coding of the image block is performed.

9. Device according to claim 8, wherein an image blocks motion compensation circuit receiving the cues from the processing circuit and the motion vectors from the motion interface circuit so as to provide predicted blocks, a subtractor for taking the difference between the current block originating from the circuit for image rendering and for partitioning into image blocks and the predicted block originating from the motion compensation circuit so as to provide a residual block, a discrete cosine transformation circuit for the image blocks originating from the circuit for image rendering and for partitioning into image blocks or residual blocks originating from the subtractor, the choice being made by a mode selection circuit as a function of energy criteria.

10. Device according to claim 8, wherein said device transmits in intra mode one image from among N images of the sequence, N being a predetermined number, this image being that which is the subject of the rendition calculation by the circuit for rendition calculation and for partitioning into image blocks, in that other images or parts of images are transmitted in inter mode by way of just the motion vectors defining the predicted blocks and originating from the motion interface circuit, the coding on the basis of these blocks corresponding to blocks of zero value.

11. Device according to claim 8, wherein said device transmits in intra mode one image from among N images of the sequence, N being a predetermined number, this image being that which is the subject of the rendition calculation by the circuit for rendition calculation and for partitioning into image blocks, in that other images are transmitted in inter mode by way of residual blocks representing the difference between a current block and a predicted block, and which are obtained from an illumination interface circuit whose function is to calculate the difference in illumination between the current block and the block predicted on the basis of the mathematical data.

12. Device according to claim 10 further comprising an error interface circuit for detecting the error between the current block and the predicted block so as to force the coding of the current blocks to intra mode when the error with the predicted block exceeds a certain threshold.

13. Device according to claim 9, wherein the digital data are compressed according to the MPEG 2 format or a derived format.

* * * * *